US007535353B2

(12) United States Patent
Hirai et al.

(10) Patent No.: US 7,535,353 B2
(45) Date of Patent: May 19, 2009

(54) SURVEILLANCE SYSTEM AND SURVEILLANCE METHOD

(75) Inventors: Seiichi Hirai, Koshigaya (JP); Naoki Hashiguchi, Hamura (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 218 days.

(21) Appl. No.: 11/681,889

(22) Filed: Mar. 5, 2007

(65) Prior Publication Data

US 2008/0074256 A1 Mar. 27, 2008

(30) Foreign Application Priority Data

Mar. 22, 2006 (JP) ............................ 2006-078338

(51) Int. Cl.
*G08B 13/00* (2006.01)

(52) U.S. Cl. .................... 340/541; 340/540; 340/573.4; 340/609; 340/572.1; 340/572.4; 340/5.1; 340/5.2; 348/153; 348/154; 348/159; 348/163

(58) Field of Classification Search ................. 340/541, 340/540, 573.4, 609, 572.1, 572.4, 5.1, 5.2; 348/153, 154, 159, 163
See application file for complete search history.

(56) References Cited

U.S. PATENT DOCUMENTS 7,123,126 B2 * 10/2006 Tanaka et al. ................ 340/5.2

FOREIGN PATENT DOCUMENTS

JP 2005-143016 6/2005

OTHER PUBLICATIONS

OKI Technical Review, Oct. 2005, No. 4, vol. 72, No. 4.

* cited by examiner

*Primary Examiner*—Tai T Nguyen
(74) *Attorney, Agent, or Firm*—Brundidge & Stanger, P.C.

(57) ABSTRACT

Surveillance system and surveillance method for detecting intruders. An image-pickup unit takes an image of a predetermined area, a person detection unit detects, on the basis of the taken image, information concerning people pictured in the image, radio terminal units are held and carried by people, radio reception units receive signals transmitted by radio from the radio terminal units present in the predetermined area, a terminal detection unit detects information concerning the radio terminal units on the basis of the received signals and an intruder decision unit detects information concerning an intruder on the basis of the information concerning the detected persons and the information detected in connection with the radio terminal units.

8 Claims, 6 Drawing Sheets

SURVEILLANCE SYSTEM AND SURVEILLANCE METHOD

INCORPORATION BY REFERENCE

The present application claims priority from Japanese application JP2006-078338 filed on Mar. 22, 2006, the content of which is hereby incorporated by reference into this application.

BACKGROUND OF THE INVENTION

The present invention relates to a surveillance system for surveilling an image taken or image-picked up by, for example, a surveillance camera and more particularly, to surveillance system and method for detecting an intruder.

For example, in hotels, convenience stores, financial agencies or commercial and public facilities such as dams, railroads and thoroughfares, an image surveillance system has hitherto been installed with the aim of assuring crime deterrent and accident prevention.

In the image surveillance system, an object to be surveilled is picked up with an imaging device such as a camera and its image is transmitted to a surveillance center such as a guardian office or a janitor room so than a stationary surveillant may watch the image to provoke the warning as necessary or record/save the image.

Also, a technique called image recognition, for example, has been known according to which an image is digitized and the existence or movement of an object pictured on the image is identified from brightness or color information each pixel of the image has or from its time series change or distribution. Then, as the CPU (central processing unit) advances in its performance, the range of such an object as to be recognizable through the technique as above expands and recently, recognition can be promoted to such an extent that objects including humans, dogs, cats and cars and even a personal face as well can be recognized.

Further, JP-A-2005-143016 discloses a technique of counting the number of persons (visitors) inside a surveillance area of a shop, for instance.

Furthermore, an intruder detection system has been studied as an application of the aforementioned image recognition technique to the image surveillance system described above.

In the intruder detection system, intrusion of a person into a preset surveillance area is detected through the image recognition technique to inform a surveillant of the intrusion or to warn the intruder, thereby alleviating the burden imposed on the surveillant or deterring the intruder from committing an intrusion.

SUMMARY OF THE INVENTION

When making this invention, the present inventors have studied an intruder detection system constructed as exemplified in FIG. 6.

The intruder detection system of this example has a camera 111, an intruder detection unit 112, a surveillance terminal unit 113, a video recording unit 114, an alarm unit 115 and transmission media b1 to b5.

Also illustrated in FIG. 6 are a surveillance target area A11 the camera 111 photographs and an intruder 101 present in the surveillance target area A11.

The camera 111 having an image-pickup section and an image data output section takes a photograph of the surveillance target area A11 and transmits data of a taken image to the intruder detection unit 112 through the transmission medium b1, to the surveillance terminal unit 113 through the transmission medium b2 and to the video recording unit 114 through the transmission medium b3.

The intruder detection unit 112 having an image data input section, a CPU and a trigger signal output section applies an image recognition process (in this example, an intruder detection process) to the inputted image data by using the CPU. If the result determines that an intruder 101 exists in the surveillance target area A11 (presence of intruder), the trigger signal output section outputs signals which in turn are forwarded to the video recording unit 114 and alarm unit 115 through the transmission media b4 and b5, respectively.

The surveillance terminal unit 113 having an image data input section displays the inputted image data.

The video recording unit 114 having an image data input section and a trigger signal input section follows an input signal to start/stop video recording of the inputted image data.

The alarm unit 115 having a trigger signal input section follows an input signal to inform a surveillant of the presence of the intruder by sound or light.

The intruder detection system shown in FIG. 6 is however constituted on the basis of such a logic that the area A11 to be surveilled is an area where people are prohibited from going in and out and that the entrance of a person to the area ordinarily devoid of the entrance and exit of people is considered to be suspicious and therefore the system has been found to face a problem that for example, in an area ordinarily undergoing or accepting the entrance and exit of people, an intruder cannot be found.

The present invention has been made in the light of such a problem and has for its object to provide a surveillance system capable of finding an illegal object such as an intruder in an area ordinarily accepting the entrance and exit of people.

To accomplish the above object, a surveillance system according to one aspect of the present invention is constructed as below to detect an illegal object.

More particularly, an image-pickup unit takes an image of a predetermined area (an area to be surveilled). On the basis of the image taken by the image-pickup unit, an object detection unit detects pieces of information concerning objects pictured on the image.

Then, radio terminal units are held and carried by genuine or legitimate objects. Radio reception units receive signals sent by radio from the radio terminal units being present in the predetermined area. On the basis of the signals received by the radio reception units, a terminal detection unit detects pieces of information concerning the radio terminal units.

Then, on the basis of the information detected by the object detection unit and the information detected by the terminal detection unit, an illegal object detection unit detects information concerning an illegal object.

Accordingly, by detecting the information concerning the objects present in the surveillance target area and the information concerning the radio terminal units and grounding on the fact that the legitimate object holds the radio terminal unit but an illegal object does not hold the radio terminal unit, the illegal object cab be detected and in, for example, an area ordinarily undergoing the entrance and exit of objects (for example, people), an illegal object (for example, an intruder) present among legitimate objects (for example, children) can be found.

As the predetermined area (area to be surveilled), various kinds of areas can be used.

Also, various kinds of objects can be used including, for example, people, animals, mobile bodies such as cars and other subjects.

The image-pickup unit can be constituted with a camera, for instance.

The information concerning objects and the information concerning radio terminal unit can be detected and as the information concerning illegal objects, information regarding the number and the position, for example, can be detected.

The signal sent by radio from the radio terminal unit may include either, for example, identification information set to each radio terminal unit or, for example, information of a position of each radio terminal unit detected through the GPS function provided for each radio terminal unit.

As the radio terminal unit, various types can be used, including the use of, for example, a dedicated unit or the utilization of a cell phone terminal unit, for instance.

The surveillance system according to the present invention is constructed as exemplified below.

More particularly, the object detection unit detects information regarding the number of objects and positions thereof as the information concerning the objects.

The terminal detection unit detects information regarding the number of radio terminal units and positions thereof as the information concerning the radio terminal units.

When the number of objects detected by the object detection unit is larger than the number of radio terminal units detected by the terminal detection unit, the illegal object detection unit determines that an object, for which a position of the object detected by the object detection unit does not coincide with a position of a radio terminal unit detected by the terminal detection unit, is an illegal object and detects information concerning the illegal object.

Accordingly, the number of objects present in the surveillance area being larger than the number of radio terminal units present therein indicates the presence of an object or objects not holding the radio terminal unit and hence such an object can be detected as being an illegal object.

The surveillance system according to the present invention is constructed as also exemplified below.

More particularly, three or more radio reception units are provided. Then, on the basis of signals received by the plural radio reception units, the terminal detection unit detects information regarding positions of radio terminal units.

Specifically, the three or more radio reception units are located at different sites and by receiving signals sent by radio from the same radio terminal unit at the different sites, a position of that radio terminal unit can be specified on the basis of the reception signals at the different sites.

The surveillance system according to the present invention is constructed also exemplified as below.

More particularly, when the illegal object detection unit detects the presence of an illegal object, an illegality processing apparatus executes a predetermined process.

Accordingly, with the presence of the illegal object detected, various processes can be executed to support a surveillant for surveillance.

As the predetermined process executed when the presence of an illegal object is detected, various processes can be used including, for example, a process of recording an image taken by the image-pickup unit, a process of informing detection of the illegal object by sound or light, a process of more carefully capturing the detected illegal object through an image taken by the camera and zooming up the image and a process of emphasizing the detected illegal object for its display on the screen.

The surveillance system according to the present invention is constructed as further exemplified as below.

More particularly, a storage unit stores the correspondence between identification information pieces of radio terminal units held by legitimate objects and information pieces regarding sizes of the legitimate objects.

Then, the object detection unit detects the information regarding the size of the legitimate object as the information concerning the object.

Thus, even when the position of the object coincides with that of the radio terminal unit, the illegal object detection unit determines, on the basis of the information regarding the size of the object detected by the object detection unit and besides the stored contents of the storage unit, the object as being illegal if the size of the object does not coincide with the size corresponding to identification information of the radio terminal unit.

Accordingly, even when a position of an object present in the surveillance area coincides with a position of a radio terminal unit, it is determined, by non-coincidence of a size of the object with a size corresponding to identification information of the radio terminal unit, that the object even holding the radio terminal unit is not a legitimate object but is an illegal object, with the result that for example, the object (for example, a person) illegally getting and holding the radio terminal unit can be detected.

The storage unit can be constructed by, for example, a memory.

As the identification information, information such as for example different unique numbers set to individual radio terminal units can be used.

As the size of the object, for example, a longitudinal length, a lateral length or an area on a taken image can be used and as an example, especially when the object is a person, a height of the person can be used.

It is possible to provide the present invention in the form of a program or a recoding medium.

The program according to the present invention is executable by a computer constituting each of the units and various kinds of functions can be realized with the computer.

In the recording medium according to the present invention, a program executable by a computer constituting each unit is recorded readably by an input means of the computer and the program causes the computer to execute various kinds of processes.

The present invention can also be provided in terms of a method. In a method according to the present invention, various processes constituting the method are executed by means of individual units dedicated to execute the processes.

A surveillance method for detecting an illegal object according to another aspect of the present invention, comprises the steps of:

taking an image of a predetermined area by means of an image-pickup unit;

detecting, on the basis of the image taken by the image-pickup unit, information including the number of objects and positions thereof in the image by means of an object detection unit;

receiving signals transmitted by radio from radio terminal units held by the objects present in the predetermined area by means of radio reception units;

detecting, on the basis of the signals received by the radio reception units, information including the number of the radio terminal units and positions thereof by means of a terminal detection unit; and detecting, on the basis of the information detected by the object detection unit and the information detected by the terminal detection unit, information concerning an illegal object by means of an illegal object detection unit.

In an embodiment, the step of detecting information concerning an illegal object includes comparing the number of detected objects with the number of detected radio terminal units and determining the presence of the illegal object when the number of detected objects is larger than the number of detected radio terminal units, and the surveillance method further comprises the steps of:

collating positions of the objects in the image with the positions of the radio terminal units to search an object for which the result of collation indicates non-coincidence; and determining the non-coincident object as an illegal object and the non-coincident position as a position of the illegal object.

According to still another aspect of the invention, a surveillance method for detecting an illegal object comprises the steps of:

storing sizes of legitimate objects holding and carrying radio terminal units in advance in a storage unit by making the correspondence with ID data of the radio terminal units;

taking an image in a predetermined area by means of an image-pickup unit;

detecting, on the basis of the image taken by the image-pickup unit, information including the number of objects and positions thereof in the image by means of an object detection unit;

receiving signals transmitted by radio from the radio terminal units held by the objects present in the predetermined area by means of radio reception units;

detecting, on the basis of the signals received by the radio reception units, information including the number of the radio terminal units, their positions and their ID data by means of a terminal detection unit; and detecting, on the basis of the information detected by the object detection unit and the information detected by the terminal detection unit, information concerning an illegal object by means of an illegal object detection unit.

In an embodiment, the step of detecting information concerning an illegal object includes comparing the number of the detected objects with the number of the detected radio terminal units and when the number of the detected objects is equal to or smaller than the number of the detected radio terminal units, the surveillance method further comprises the steps of:

taking sizes of legitimate objects holding the radio terminal units out of the storage unit by utilizing ID data pieces of the detected radio terminal units;

collating the sizes of the objects in the image with the sizes extracted from the storage unit and owned by the legitimate objects holding the radio terminal units;

comparing the sizes of the objects in the image with the sizes extracted from the storage unit and owned by the objects holding the radio terminal units; and determining an object for which the comparison result indicates non-coincidence as an illegal object and a non-coincident position as an illegal object position.

As described above, according to the surveillance system according to the present invention, an image of a predetermined area (area to be surveilled) is taken, objects pictured on the image are detected on the basis of the taken image, signals transmitted by radio from radio terminal units present in the predetermined area are detected, the radio terminal units are detected on the basis of the received signals and an illegal object is detected on the basis of the fact that a legitimate object holds a radio terminal unit but an illegal object does not hold the radio terminal unit, whereby for example, in an area ordinarily accepting the entrance and exit of objects (for example, people), an illegal object (for example, an intruder) existing among legitimate objects (for example, children) can be found.

Other objects, features and advantages of the invention will become apparent from the following description of the embodiments of the invention taken in conjunction with the accompanying drawings.

DESCRIPTION OF THE EMBODIMENTS

The present invention will now be described by way of example with reference to the accompanying drawings.

Figure 1:
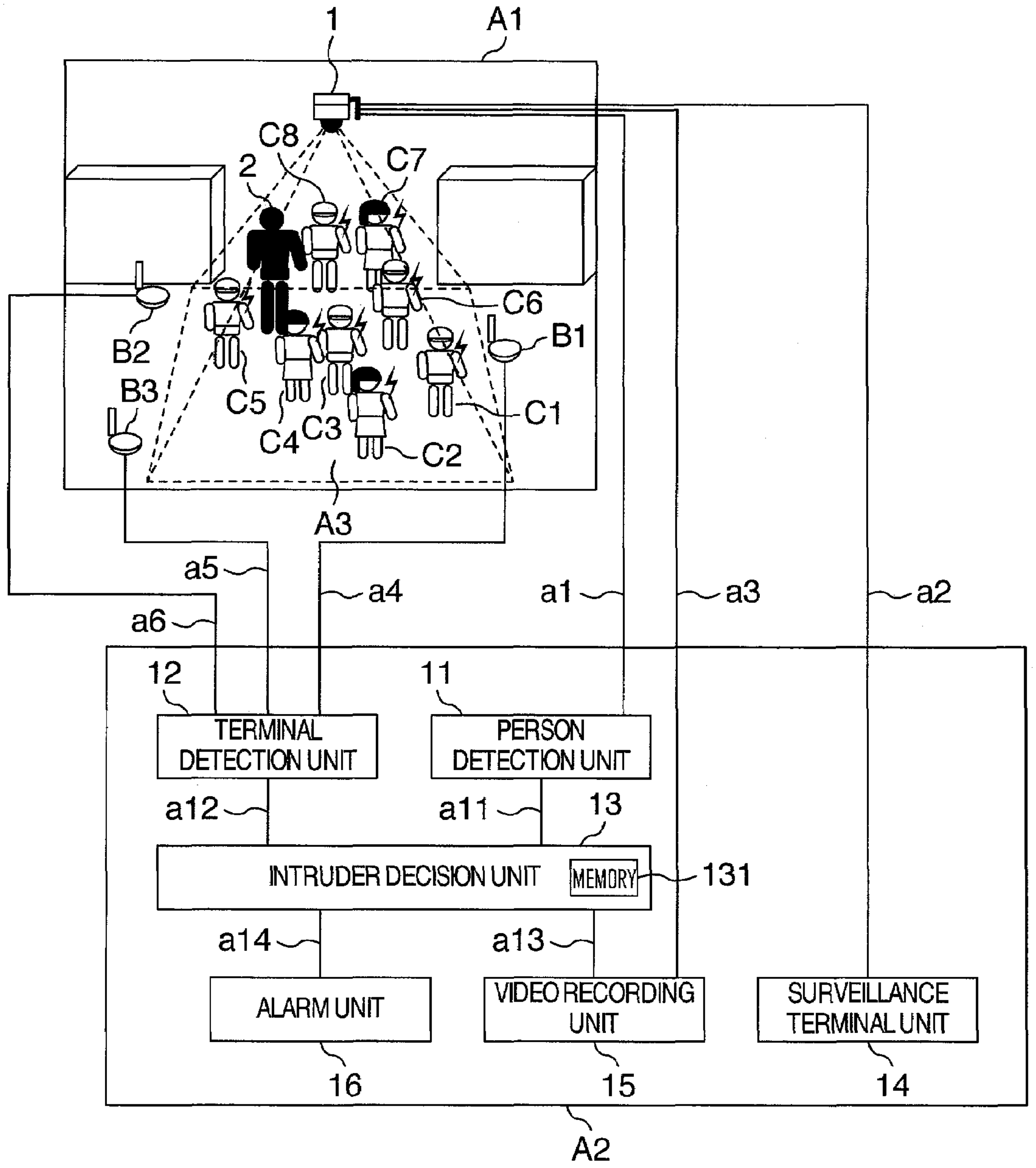
FIG. 1 is a diagram showing an example of construction of an intruder detection system according to an embodiment of the present invention.

Referring first to FIG. 1, an intruder detection system according to an embodiment of the invention is constructed as exemplified therein.

In this embodiment, the present invention is applied to intruder surveillance in schools. Specifically, the vicinity of a schoolgate is imaged and illustrated as a location A1 to be surveilled and a school staff room is imaged and illustrated as a location A2 where a surveillant attends.

In the intruder detection system of the present embodiment, a camera 1 and a plurality of (three in this example) radio base station units B1 to B3 are installed at the location A1 to be surveilled and a person detection unit 11, a terminal detection unit 12, an intruder decision unit 13, a surveillance terminal unit 14, a video recording unit 15 and an alarm unit 16 are installed at the location A2 where the surveillant attends. The intruder detection system of the present embodiment is also provided with a plurality of media for transmission of signals among the units, including transmission media a1 to a6 and a11 to a14.

Also illustrated in FIG. 1 are an area A3 an image of which is taken by the camera 1 and surveilled (surveillance target area), a plurality of (in this example, 8) children C1 to C8 present in the surveillance target area A3 and an intruder 2 present in the surveillance target area A3. In this example, the surveillance target area A3 is an area in front of the school gate through which the children C1 to C8 pass.

Although not depicted in FIG. 1, each of the children C1 to C3 carries a radio terminal unit.

The radio terminal unit of each of the children C1 to C8 includes a memory in which identification information (ID data) assigned uniquely to each of the children C1 to C8 has been stored in advance. Structurally, the radio terminal unit can be built in or mounted to, for example, a schoolbag or a nametag.

The radio terminal unit has an antenna section and functions to intermittently transmit ID data by radio to the radio base station units B1 to B3. For radio transmission from the radio terminal unit, either a scheme utilizing transmission electric waves from the radio base station units B1 to B3 based on, for example, passive type RF-ID or a scheme for transmission of an electric wave from a radio terminal unit with a power supply based on, for example, active type RF-ID or ZigBee terminal may be used. For timing of transmission from the radio terminal unit, either a passive scheme responsive to a request from each of the radio base station units B1 to B3 or a scheme for active transmission from the radio terminal unit may be employed.

Further, the intruder 2 is a person without carrying a radio terminal unit. The intruder detection system in this example intends to detect this type of intruder 2.

The camera 1 is a unit having an image-pickup section and an image data output section. As the camera 1, an analog type camera, for example, may be used or alternatively, a network type camera having in addition to the image-pickup section and image data output section an image codec for digitizing a taken image and applying a compression process to the digitized image as necessary may be used. In these types of cameras, a pan and tilt head provided with a so-called PTZ controller for pan/tilt/zoom may be attached. The type of camera 1 is not especially limited to a particular kind and for example, a special camera such as an infrared camera may be used.

The camera 1 is so disposed as to image a bird's-eye view of the surveillance target area A3 as shown in FIG. 1. In this example, the camera 1 is illustrated as being installed directly vertically above the surveillance target area A3 but it may be disposed obliquely above.

The camera 1 transmits data of a picked up image, that is, a bird's-eye view image of the surveillance target area A3 to the person detection unit 11 via the transmission medium a1, to the surveillance terminal unit 14 via the transmission medium a2 and to the video recording unit 15 via the transmission medium a3.

Each of the radio base station units B1 to B3 has an antenna section and a radio data output section, being disposed to surround the surveillance target area A3 as shown in FIG. 1.

Each of the radio base station units B1 to B3 receives ID data sent by radio from each radio terminal unit and in this phase, performs, together with the reception, measurement of reception sensitivity of the ID data sent from each radio terminal unit. Then, the individual radio base station units B1 to B3 transmit the thus acquired ID data and reception sensitivity data to the terminal detection unit 12 through the transmission media a4 to a6, respectively.

In the present example, installation of the 3 radio base station units B1 to B3 is illustrated but in this type of constitution for acquiring positional information of the radio terminal units by using the plural radio base station units B1 to B3, more than three desired numbers of units may be used. In another example of constitution, radio terminal units utilizing GPS (global positioning system) may be employed and pieces of information the radio terminal units acquired through the GPS may be transmitted to the radio base station units B1 to B3, thus enabling the radio base station units B1 to B3 to acquire the positional information of each radio terminal unit and in such a case, the number of radio base station unit need not be three or more.

The person detection unit 11 has an image data input section, a CPU and a detected data output section and may be constructed of, for example, a computer.

The person detection unit 11 causes the CPU to respond to input image data transmitted from the camera 1 to execute an image recognition process including, in this example, a person number detection process and a position detection process. Then, the person detection unit 11 transmits the obtained results of detection, that is, the number of people present in the surveillance target area A3 and pieces of information of positions the individual persons take in the surveillance target area A3 to the intruder decision unit 13 through the transmission medium all.

The terminal detection unit 12 has a radio data input section, a CPU and a detected data output section and is comprised of, for example, a computer.

By managing a history of ID data transmitted from each of the radio base station units B1 to B3, the terminal detection unit 12 counts the number of the radio terminal units present in the surveillance target area A3. Also, on the basis of reception sensitivity data transmitted concurrently from the radio base station units B1 to B3, the terminal detection unit 12 performs a position detection process for each radio terminal unit. The technique for position detection using a radio terminal unit has been reported in various literatures. For example, "Position detection using radio", OKI technical review, October, 2005, No. 204, Vol. 72, No. 4 describes an example of the position detection technique. In the present invention, the position detection can be executed by using the well-known technique arbitrarily. For example, a scheme can be used in which the intensity of a received electric wave is used for position detection. This scheme makes use of such a nature that the received electric wave intensity attenuates in inverse proportion to the distance to thereby presume the distance between a radio terminal and each of plural radio reception stations and the position of the radio terminal is estimated from the presumed distance.

The terminal detection unit 12 transmits the obtained results of detection, that is, the number of radio terminal units present in the surveillance target area A3 and the position information of each of the radio terminal units in the surveillance target area A3 to the intruder decision unit 13 through the transmission medium a12.

The intruder decision unit 13 has a detected data input section, a CPU and a trigger signal output section and is comprised of, for example, a computer. The intruder decision unit 13 includes a memory 131. The memory 131 constitutes a database in which data regarding sizes such as heights of children are stored in respect of the individual children by making the correspondence between the size data and ID data of radio terminal units the children carry.

The intruder decision unit 13 receives the information regarding the number of persons and the information of their positions which are sent from the person detection unit 11 and besides the information regarding the number of radio terminal units and the information of their positions which are sent from the terminal detection unit 12. Then, the intruder decision unit 13 collates the received number information of persons with that of radio terminal units in time synchronization to decide the presence or absence of an intruder 2 and in the presence of the intruder 2, collates the received position information of persons and that of radio terminal units, thus determining the position of the intruder 2.

When the result of decision indicates the presence of the intruder 2 (intruder existence), the intruder decision unit 13 causes the trigger signal output section to output signals which in turn are transmitted to the video recording unit 15 and alarm unit 16 via the transmission media a13 and a14, respectively. In case a camera provided with a pan and tilt head to permit PTZ control is used as the camera 1, the intruder decision unit 13 transmits, upon detection of the presence of an intruder, position information regarding the intruder 2 to the camera 1 in order for its imaging range to be zoomed in toward the intruder 2.

The surveillance terminal unit 14 has an image data input unit to display inputted image data and is comprised of, for example, a CRT monitor of analog type.

For example, in case a camera of network type is used as the camera 1, the surveillance terminal unit 14 may be constructed of a computer including a network interface, an image codec, a CRT or liquid crystal monitor and an operation interface.

The video recording unit 15 has an image data input section, a trigger signal input section and a recording medium to start or stop recording of video data inputted to the recording medium and may be comprised of, for example, a time lapse VTR of tape type.

Further, in case the network type camera, for example, is used as the camera 1, the video recording unit 15 may be comprised of a network recorder including a network interface, a recording medium randomly accessible at high speeds as represented by a hard disk or an optical disk and an interface to the recording medium.

The alarm unit 16 has a trigger signal input section and a sound output section or light output section and, for example, can be a PATLITE™ sold from PATLITE corporation. The PATLITE is a kind of rotary beacon light. Alternatively, the alarm unit 16 may be constructed of, for example, a simple buzzer or a device having the PATLITE™ and the buzzer in combination.

The alarm unit 16 is triggered by the input signal to inform the surveillant of the presence of an intruder 2 by sound or light.

The transmission media a1 to a6 and a11 to a14 are each formed of, for example, a network cable, coaxial cable or serial cable, having the function to transfer transmitted data. In the present example, a network device such as a router, switch or hub and an image distributor may also be included in the category of the transmission media a1 to a6 and a11 to a14. Further, the transmission media a1 to a4 and a11 to a14 may be constituted by a radio LAN (local area network), for instance.

In this example, for clarification of functions and simplification of explanation, the camera 1, person detection unit 11, terminal detection unit 12 and intruder decision unit 13 are illustrated as being physically separate units but they may be ganged in arbitrary combination so as to be a unified unit. For example, a unit unifying the camera 1 and person detection unit 11, a unit unifying the terminal detection unit 12 and intruder decision unit 13 or a unit incorporating all units 1 and 11 to 13 may be used.

Further, in the present example, for simplicity of explanation, the camera 1, person detection unit 11, terminal detection unit 12, intruder decision unit 13, surveillance terminal unit 14, video recording unit 15 and alarm unit 16 are respectively illustrated as being one in number but structurally, any of these units may be plural in number.

The camera 1 is installed in positional relation to the radio base station units B1 to B3 as will be described below.

Figure 2:
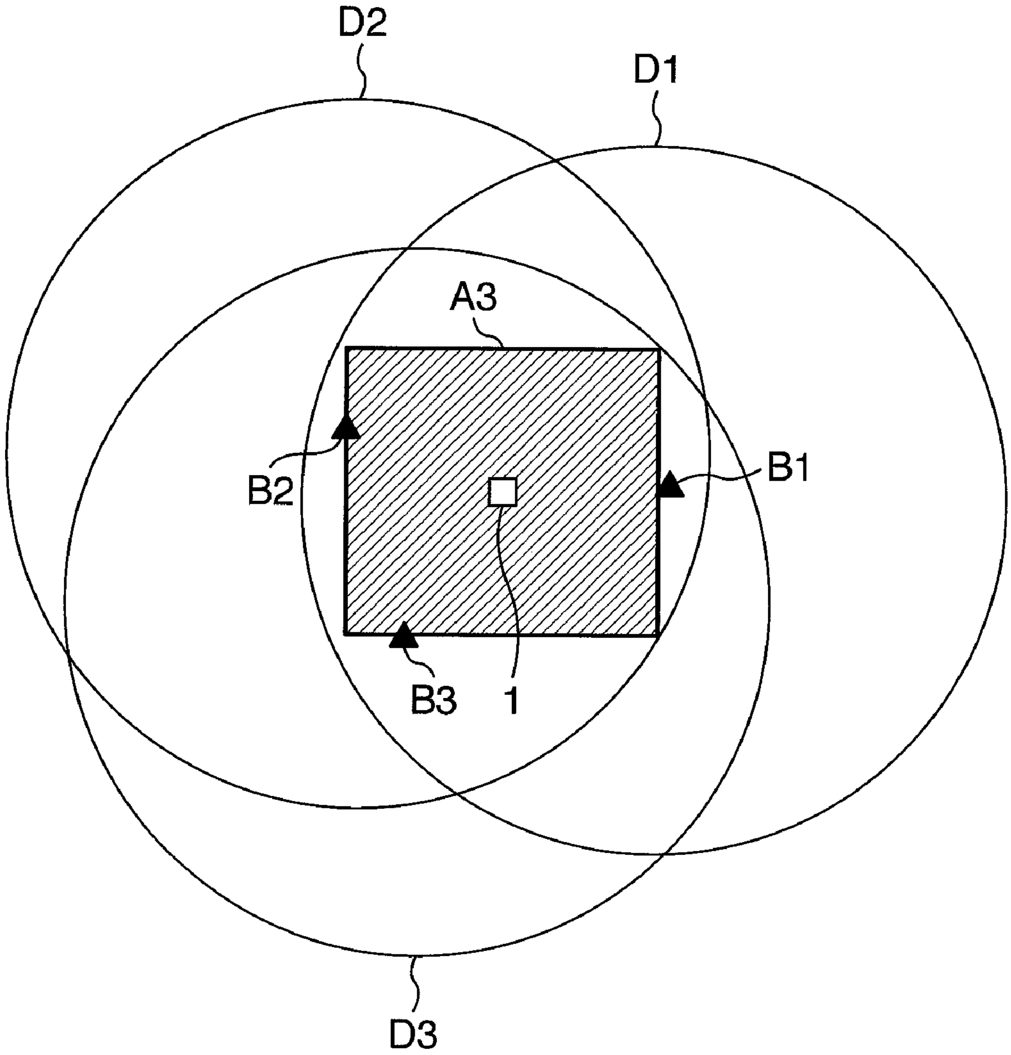
FIG. 2 is a diagram showing an example of the installation positional relation between a camera and radio base station units.

Referring to FIG. 2, an example of the installation positional relation between the camera 1 and each of the radio base station units B1 to B3 is shown in the form of a bird's-eye view image taken directly above the surveillance target area A3.

Specifically, illustrated in FIG. 2 are the camera 1 (a smaller square part in the figure), the radio base station units B1 to B3 (triangular parts in the figure), radio reachable ranges D1 to D3 of the individual radio base station units B1 to B3 (circular parts in the figure) and the surveillance target area A3 (a hatched portion in a larger square part in the figure).

The camera 1 is installed such that its imaging range coincides with (or approximates) the surveillance target area A3. Depending on the type of camera, an arbitrary valid range within the imaging range is settable and in this case, the valid range may coincide with (or approximate) the surveillance target area A3.

Since in this example the radio base station units B1 to B3 adopt a non-directional radio system, each of the radio reachable ranges D1 to D3 is circular (three-dimensionally, hemispherical).

The radio base station units B1 to B3 are installed such that an overlap of the radio reachable ranges D1 to D3 completely involves the surveillance target area A3. It will be appreciated that in this example the overlap is so depicted as to relatively finely (relatively accurately) circumscribe the surveillance target area A3 and practically, the installation minimizing a circumscription non-coincident gap as far as possible under the first condition of complete inclusion of the surveillance target area A3 is preferable from the viewpoint of reducing overlooking.

Figure 3:
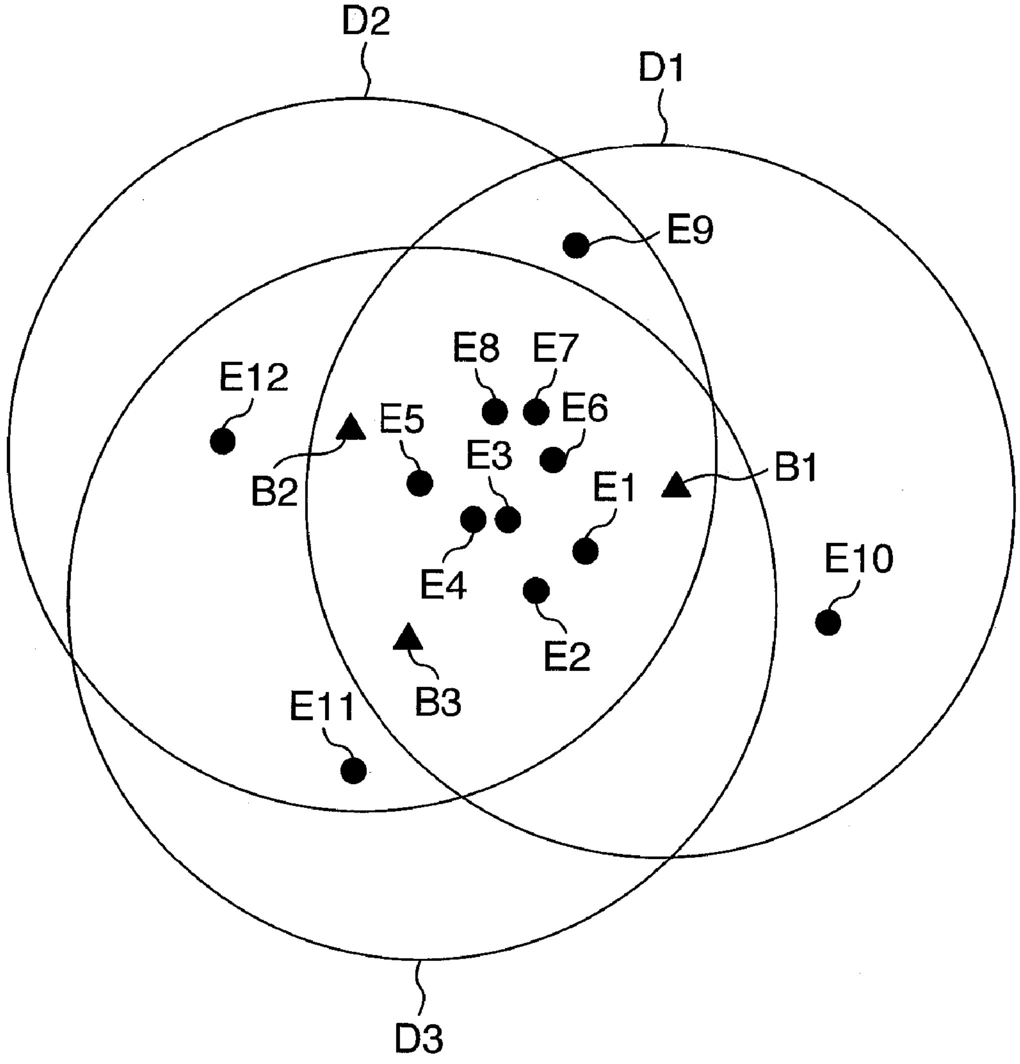
FIG. 3 is a diagram useful to explain a method of counting the number of radio terminal units present in an area to be surveilled.

Turning now to FIG. 3, a method of counting the number of radio terminal units inside the surveillance target area A3 by means of the terminal detection unit 12 will be described.

Illustrated in FIG. 3 are the radio base station units B1 to B3 (triangular parts in the figure), radio reachable ranges D1 to D3 (inside larger circular parts in the figure) of the individual radio base station units B1 to B3 and plural (twelve in this example) radio terminal units E1 to E12 (smaller circular parts in the figure).

The radio base station unit B1 is conditioned to capture the radio terminal units E1 to E10 inside its radio reachable range D1 and it intermittently receives ID data and reception sensitivity data from the individual radio terminal units E1 to E10 to sequentially send them to the terminal detection unit 12. The radio base station unit B2 is conditioned to capture the radio terminal units E1 to E9, E11 and E12 inside its radio reachable range D2 and it sequentially transmits to the terminal detection unit 12 ID data and reception sensitivity data received intermittently from the individual radio terminal units E1 to E9, E11 and E12. The radio base station unit B3 is conditioned to capture the radio terminal units E1 to E8, E11 and E12 inside its radio reachable range D3 and it sequentially transmits to the terminal detection unit 12 ID data and reception sensitivity data received intermittently from the individual radio terminal units E1 to E8, E11 and E12.

The terminal detection unit 12 constantly receives transmission data from the individual radio base station units B1 to B3 and uses the ID data to fulfill control as to which one of the radio terminal units each of the individual radio base station units B1 to B3 captures at present.

The terminal detection unit 12 counts the number of radio terminal units present in the overlap of the radio reachable ranges D1 to D3 owned by the three radio base station units B1 to B3, that is, the number of radio terminal units all of the three radio base station units B1 to B3 capture in common and sets it as the number of radio terminal units inside the surveillance target area A3.

In this example, the radio terminal units E1 to E8 exist in the overlap and the number of radio terminal units is 8.

Next, reference will be made to FIG. 4 to describe a method of deciding the presence/absence of an intruder 2 and a position of the intruder 2.

Figure 4:
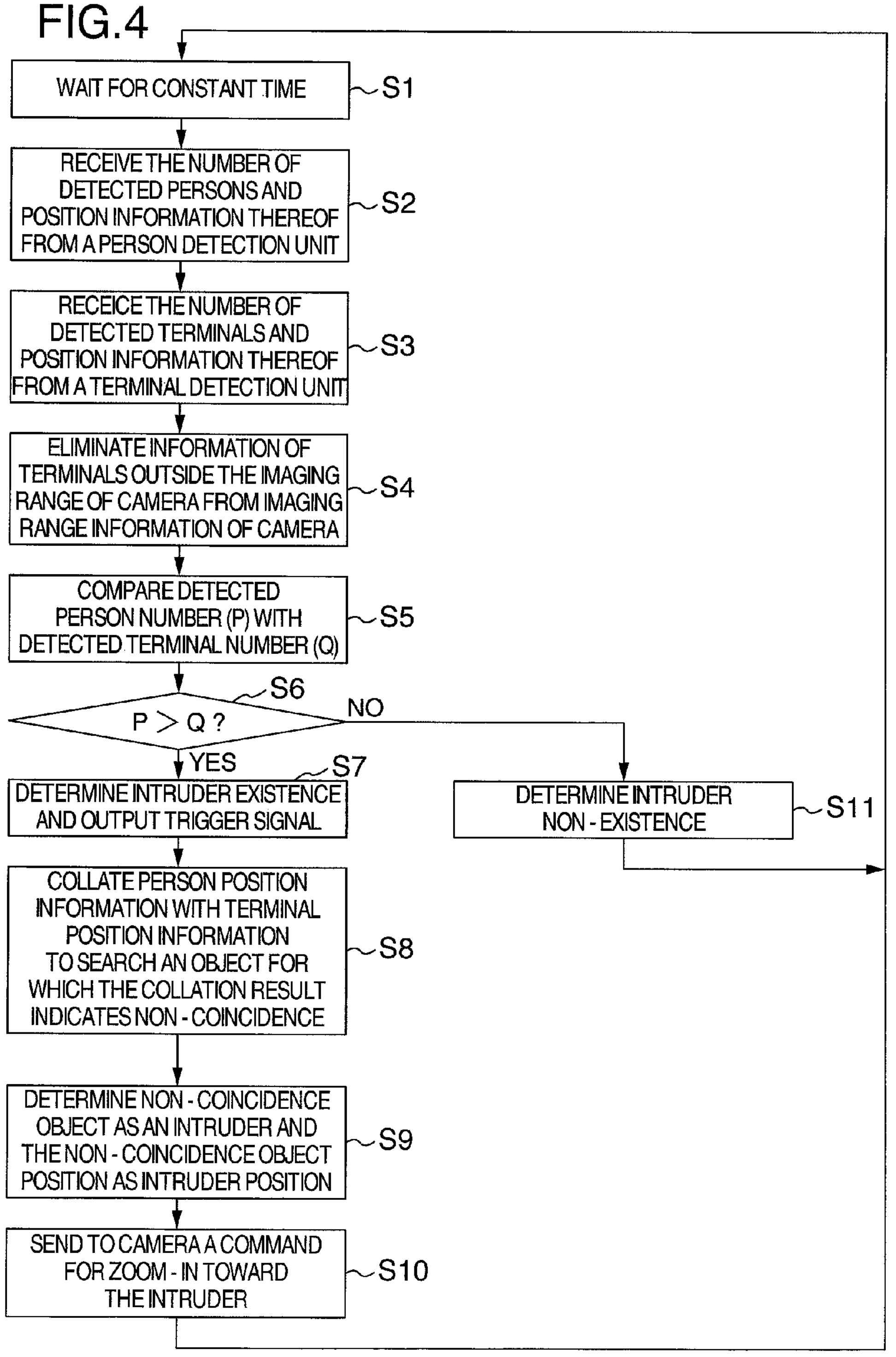
FIG. 4 is a flowchart showing an example of an intruder decision process carried out by an intruder decision unit.

Shown in FIG. 4 is a flowchart of procedures in an intruder decision process carried out by the intruder decision unit 13.

The intruder decision unit 13 waits for a constant time (step S1) and at the termination of the constant time, proceeds to the next procedure (step S2). Preferably, a system designer determines an optimum value of the constant time by taking into account, for example, the area of surveillance target area A3 and the moving speed or the distance from the imaging camera 1 a target object (a person in this example) exhibits.

Next, the intruder decision unit 13 receives the number of detected persons and information of their positions from the person detection unit 11 (step S2) and the number of detection terminals and position information thereof from the terminal detection unit 12 (step S3).

Subsequently, the intruder decision unit 13 superimposes imaging range information of camera 1 on the obtained position information of the individual radio terminal units E1 to E8 so as to eliminate radio terminal units existing outside the imaging range of camera 1 (step S4). To explain the purpose of this filtering, the overlap of the radio reachable ranges D1 to D3 does not have an area completely coincident with the surveillance target area A3, leaving behind a non-coincident portion in which any radio terminal units possibly exist and therefore, the filtering is executed. Imaging range information of camera 1 is set manually in advance in the unit, for instance. While in this example the filtering is executed by the intruder decision unit 13, the terminal detection unit 12 may be so constructed as to execute the filtering.

Thereafter, the intruder decision unit 13 makes a magnitude comparison between a value of the obtained number (P) of detected persons and a value of the number (Q) of detected terminals obtained after the filtering (hereinafter simply referred to as detected terminal number) (step S5).

If the comparison result (step S6) indicates that the detected person number P is larger than the detected terminal number Q, that is, the relation "P>Q" standing, the program proceeds to step S7 but if the detected person number P is less than or equal to the detected terminal number Q, that is, the relation "P≦Q" standing, the program proceeds to a process in step S11.

With the detected person number P being less than or equal to the detected terminal number Q, the intruder decision unit 13 determines the absence of an intruder (intruder non-existence) (step S11) and the program returns to the process in step S1.

On the other hand, when the comparison result (step S6) indicates that the detected person number P is larger than the detected terminal number Q, the intruder decision unit 13 determines the presence of an intruder 2 (intruder existence) and outputs a trigger signal to the video recording unit 15 and the alarm unit 16 (step S7).

Next, within the imaging range of camera 1, the intruder decision unit 13 collates the position information of each person obtained from the process in step S2 with the position information of each radio terminal unit obtained from the process in step S3 to search an object for which the collation result is non-coincident (step S8). As the permissible error in coincidence the correlation result of position information exhibits, an arbitrary value can be set in the unit, for instance.

Next, the intruder decision unit 13 determines an object for which the result of collation indicates non-coincidence as an intruder 2 and the position of the object as a position of the intruder 2 (step S9).

When the camera with pan and tilt head is used, the intruder decision unit 13 transmits to the camera with pan and tilt head a zoom-in command toward the position of intruder 2 (step S10). In the absence of the camera with pan and tilt head in the system or without the necessity of zoom-in, the process in step S10 can be omitted.

Then, the intruder decision unit 13 returns to the process in step S1.

Figure 5A:
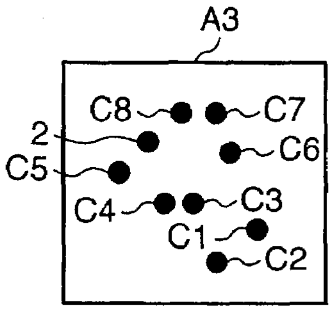
FIGS. 5A to 5C are diagrams for explaining an example of collation between position information of detected people and that of detected terminals.
Figure 5B:
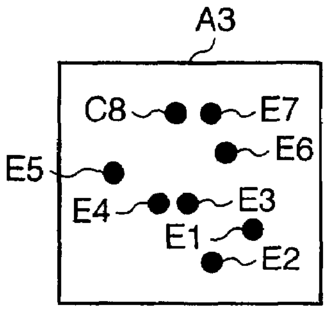
Figure 5C:
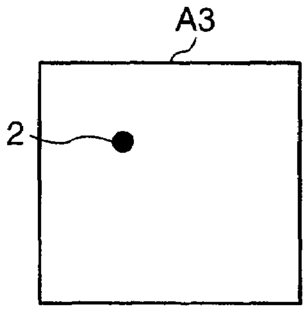
Figure 6:
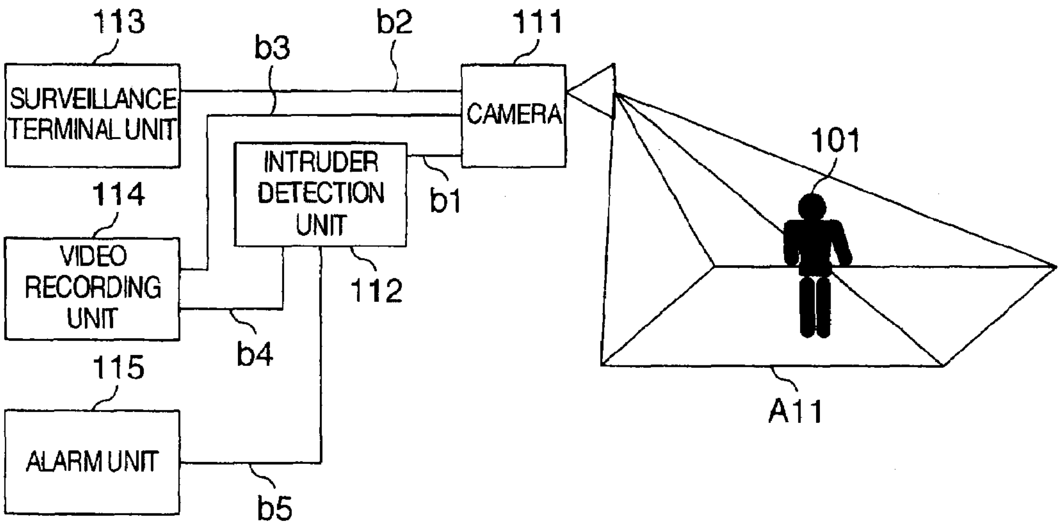
FIG. 6 is a diagram showing an example of construction of a prior art intruder detection system.

Referring to FIGS. 5A, 5B and 5C, the collation between the position information of detected person and the position information of detected terminal will be described more specifically. As an example, the surveillance target area A3 is conditioned as shown in FIG. 1.

As shown in FIG. 5A, the number of detected persons obtained by the intruder decision unit 13 through the process in step S2 is nine and the position information can be obtained in respect of the individual persons C1 to C8 and a person 2. In FIG. 5A, the persons C1 to C8 and 2 are illustrated visually but the position information is held in terms of coordinate values in the intruder decision unit 13.

As shown in FIG. 5B, the number of detected terminals obtained by the intruder decision unit 13 through the process in step S3 is eight and the position information can be obtained in respect of the individual radio terminal units E1 to E8. In FIG. 5B, the radio terminal units E1 to E8 are also illustrated visually but the position information is held in terms of coordinate values in the intruder decision unit 13.

It is assumed in this example that all the radio terminal units E1 to E8 are determined as being present in the imaging range of camera 1 through the process in step S4.

Since in the case of this example the detected person number P=9 and the detected terminal number Q=8 are determined in the process of step S5 and the relation "P>Q" stands in the process of step S6, the intruder decision unit 13 determines the intruder existence in the process of step S7 to output a trigger signal and responsive thereto, the video recording unit 15 starts recording and the alarm unit 16 sounds an alarm or flickers light to give a notice to the surveillant. Or in a post-process of the step S7 or S9, an alarm message may be displayed on an image displayed on the surveillance terminal unit 14 or an intruder may be displayed emphatically by surrounding the intruder with a frame on the image.

As shown in FIG. 5C, as a result of the collation between the position information of persons and the position information of radio terminal units by the intruder decision unit 13 in the process of step S8, one person is determined as an intruder 2 in the process of step S9 and the position information of the person obtained in the process of step S2 is determined as position information of the intruder 2.

In the process of step S10, a zoom-in command toward the position of intruder 2 is sent to the camera 1, with the result that the intruder 2 is displayed exaggeratedly on the screen of surveillance terminal unit 14 to enable the surveillant to watch in detail the face, belongings and behavior of the intruder 2. As the camera for zooming in the intruder 2, the camera 1 for imaging the surveillance target area A3 may for example be used or alternatively, a different camera may be used. As the different camera, a camera with pan and tilt head, for example, may be used which takes a photograph of the surveillance target area A3 from obliquely above to facilitate, for example, visibility of the face of the intruder.

In the process of step S10, in addition to imaging based on zoom-in, a mode can be used in which, for example, the camera is so controlled as to emphatically display an image at the position of intruder 2 to discriminate it from an image of another portion.

In the case of the present example, when the detected person number P is determined as being equal to or less than the detected terminal number Q through the processes of steps S5 and S6, that is, the relation "P≦Q" stands, the intruder non-existence is determined. Thus, by determining the absence of an intruder when not only "P=Q" but also "P<Q" stands, erroneous information can be eliminated even when persons overlap and so the person detection unit 11 determines the number of detected persons as being less than the actual number.

Further, for example, symbols may be displayed on the screen of monitor like the illustration in FIG. 3 and FIGS. 5A, 5B and 5C.

In addition, the intruder decision unit 13 may store, for example, height data of carriers of the individual radio terminal units E1 to E12 in the database 131 by making the correspondence with ID data assigned to the individual radio terminal units E1 to E12 and when the person detection unit 11 detects heights of individual persons through the image recognition process and the intruder decision unit 13 collates the heights of individual persons detected by the person detection unit 11 with the heights of the individual persons stored in the database 131, it is possible by the collation result indicative of non-coincidence of height data to determine that a radio terminal unit is mounted to a person who cannot originally be a holder, for example, a third person of malice who impersonates an legitimate person, thus actuating the video recording unit 15 and alarm unit 16.

By making reference to FIG. 7, a method for deciding the presence/absence of an intruder and a position of the intruder on the basis of height data will be described.

Figure 7:
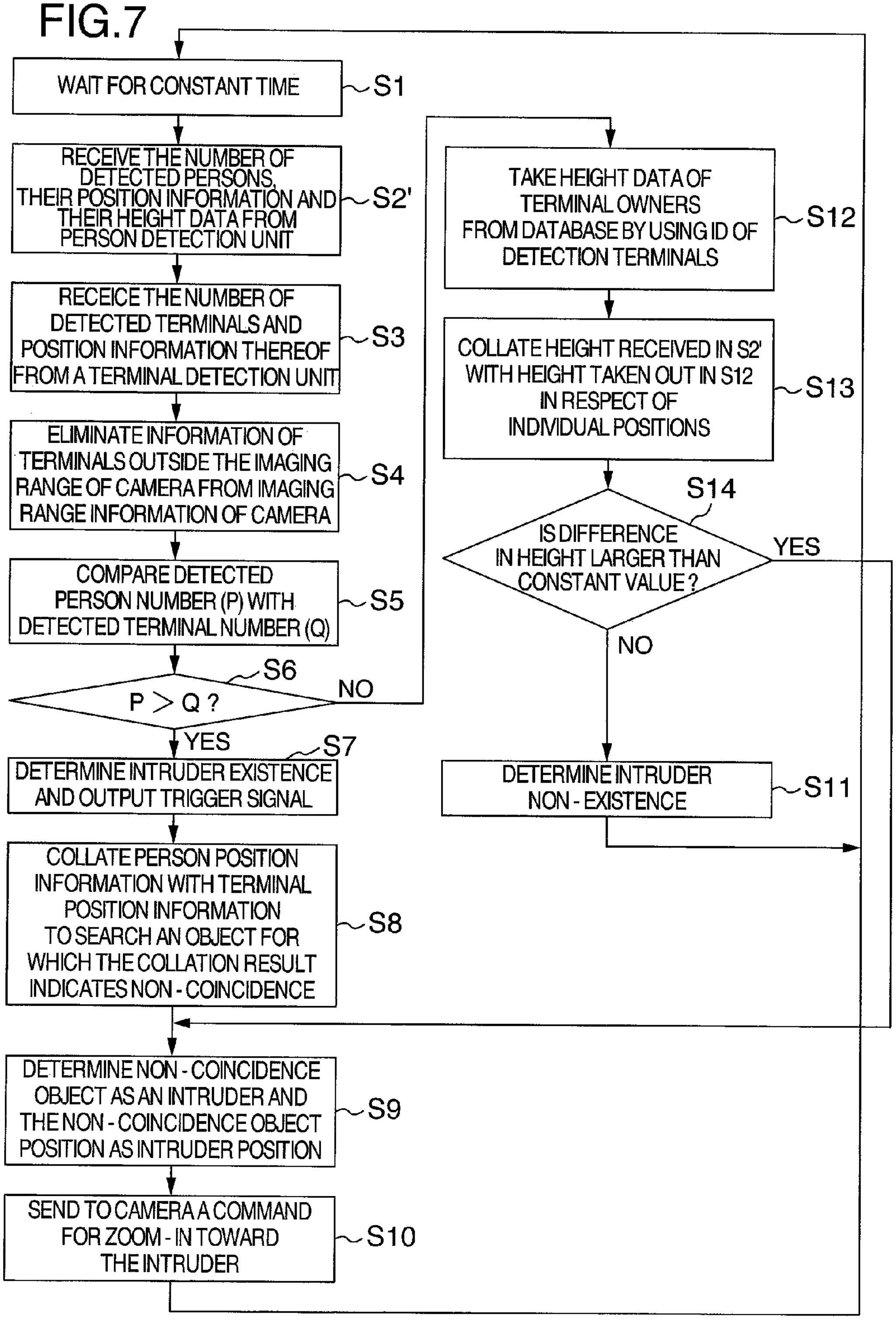
FIG. 7 is a flowchart showing another example of the intruder decision process carried out by the intruder decision unit.

Shown in FIG. 7 is an example of a flowchart of procedures in the intruder decision process carried out by the intruder decision unit 13. Steps S1 and S3 through S11 are the same as those in the flowchart shown in FIG. 4 and so step S2' and newly added steps S12 to S14 will be described.

In the step S2', in addition to the number of detected persons and information of their positions, pieces of height data of individual persons are received from the person detection unit. If P≦Q is determined in the step S6, the intruder decision unit 13 takes height data of an owner of each terminal out of the database 131 by utilizing an ID of each detection terminal (step S12). Then, the intruder decision unit 13 collates the height data received in the step S2' with the height data acquired in the step S12 in respect of individual positions (step S13). On the basis of the collation result, the intruder decision unit 13 makes a comparison as to whether the difference in height is larger than a predetermined value (step S14) and when the height difference is above the predetermined value at a position, the intruder decision unit proceeds to the step S9 to determine that the position is for an intruder and a person at the position is the intruder. If the height difference is determined to be less than the predetermined value in the step S14, the intruder decision unit proceeds to the step S11 to determine the intruder non-existence.

As described above, in the intruder detection system of the present example, the number of persons imaged in the surveillance target area A3 and the positions of the individual persons are detected, the number of radio terminal units E1 to E8 present in the radio reachable ranges D1 to D3 of radio base station units B1 to B3 and the positions of the individual radio terminal units E1 to E8 are detected, the presence/absence of an intruder 2 is decided from the magnitude relation between the detected numbers of persons and radio terminal units and the position of the intruder 2 is decided from collation between the detected position information of the persons and the detected position information of the radio terminal units.

Accordingly, in the intruder detection system of this example, even when an area where for example, a person especially a plurality of people enter and exit usually is set as the surveillance target area A3, an intruder 2 can be detected to inform the surveillant of detection of the intruder or to warn the intruder 2, so that the burden on the surveillant can be mitigated or the intruder 2 can be deterred from committing an intrusion.

Further, with the pan and tilt head mounted camera capable of performing so-called PTZ control based on pan/tilt/zoom used in the present intruder detection system, when an intruder 2 is detected, the camera with pan and tilt head is zoomed in toward the intruder 2 to enable the surveillant to watch the face, belongings and behavior of the intruder 2 in detail, thereby supporting the surveillant attending even at a remote location in taking more infallible countermeasures.

In the present example, an intruder detection system is exemplified as the surveillance system, in which people are objects, children C1 to C8 holding radio terminal units E1 to E8 are legitimate objects and an intruder 2 is an illegal object.

Further, in the present example, an image-pickup unit plays the function of the camera 1 for taking an image of the surveillance target area A3, an object detection unit plays the function of the person detection unit 11 for detecting the number of objects and positions thereof, a radio reception unit plays the function of the radio base station units B1 to B3 for receiving transmission by radio from the radio terminal units E1 to E8, a terminal detection unit plays the function of the terminal detection unit 12 for detecting the number of the radio terminal units E1 to E8 and positions thereof, an illegal object detection unit plays the function of the intruder decision unit 13 for detecting an illegal object, an illegality processing apparatus plays the function of the video recording unit 15 and alarm unit 16 for performing recording and warning, respectively, in the wake of detection of an illegal object, and a storage unit plays the function of the intruder decision unit 13 for storing, in preparation for making a decision on the size of an object, the correspondence between pieces of identification information of the radio terminal units E1 to E12 (in this example, ID data pieces) and sizes of objects holding the radio terminal units (in this example, heights of persons) in a memory or database.

Structurally, the system and units according to the present invention are not always limited to those set forth so far but may be constructed in various ways. Also, the present invention can be offered in the form of a method or system for executing the processes according to the invention, a program for realizing the method or system, a recording medium for recording the program or various of types of system and unit.

The field to which the present invention is applicable is not always limited to that described so far but may be applied to various fields.

Various processes executed in the system and units according to the present invention may be controlled by, for example, causing a processor to execute a control program stored in a ROM (read only memory) in a hardware resource provided with the processor and the memory or may be materialized with, for example, a hardware circuit having independent individual functional means for executing the processes.

Furthermore, the present invention can be grasped as a recording medium readable by a computer, such as a flexible disk (floppy "TM" disk) or CD (compact disk)-ROM for storing the control program, or as the program (itself) and by inputting the control program from the recording medium to the computer and causing the processor to execute the inputted control program, the processes according to the present invention can be executed.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A surveillance system for detecting an illegal object, comprising:

an image-pickup unit for taking an image of a predetermined area;

an object detection unit for detecting information concerning objects pictured in the image based on of said image taken by said image-pickup unit;

radio terminal units held by legitimate objects;

radio reception units for receiving signals transmitted by radio from said radio terminal units present in said predetermined area;

a terminal detection unit for detecting information concerning said radio terminal units based on of the signals received by said radio reception units;

an illegal object detection unit for detecting information concerning an illegal object based on of the information detected by said object detection unit and the information detected by said terminal detection units; and an illegality processing apparatus for executing a predetermined process when a presence of said illegal object is detected by said illegal object detection unit, wherein the predetermined process includes providing notice of said illegal object by performing at least one of starting recording of said illegal object by a video recording unit and issuing an alarm by an alarm unit.

2. A surveillance system according to claim 1, wherein said object detection unit detects, as the information concerning the objects, information regarding the number of said objects and positions thereof;

said terminal detection unit detects, as the information concerning the radio terminal units, information regarding the number of said radio terminal units and positions thereof; and when the number of said objects detected by said object detection unit is larger than the number of said radio terminal units detected by said terminal detection unit, said illegal object detection unit determines that an object for which a position of the object detected by said object detection unit does not coincide with a position of a radio terminal unit detected by said terminal detection unit and detects is an illegal object information concerning the illegal object.

3. A surveillance system according to claim 2, wherein said system comprises three or more plural radio reception units and said terminal detection unit detects information regarding positions of said radio terminal units based on signals received by said plural radio reception units.

4. A surveillance system according to claim 2 further comprising a storage unit for storing a correspondence between identification information pieces of radio terminal units legitimate objects hold and information pieces regarding sizes of the legitimate objects, wherein said object detection unit detects, as the information concerning an object, information regarding the size of the object; and even when the position of an object coincides with the position of a radio terminal unit, said illegal object detection unit determines the object as an illegal object, based on of the information regarding the size of the object detected by said object detection unit and the contents of storage in said storage unit, when the size of said object does not coincide with the size corresponding to the identification information of said radio terminal unit.

5. A surveillance method for detecting an illegal object, comprising the steps of:

taking an image of a predetermined area by means of an image-pickup unit;

detecting, based on the image taken by said image-pickup unit, information inclusive of a number of objects pictured in said image and their positions by means of an object detection unit;

receiving signals transmitted by radio from radio terminal units held by said objects present in said predetermined area by means of radio reception units;

detecting, based on the signals received by said radio reception units, information inclusive of the number of said radio terminal units and positions thereof by means of a terminal detection unit detecting, based on the information detected by said object detection unit and the information detected by said terminal detection unit, information concerning an illegal object by means of an illegal object detection unit; and executing by an illegality processing apparatus, a predetermined process when a presence of said illegal object is detected by said illegal object detection unit, wherein the predetermined process includes providing notice of said illegal object by performing at least one of staring recording of said illegal object by a video recording unit and issuing an alarm by an alarm unit.

6. A surveillance method according to claim 5, wherein in the step of detecting information concerning an illegal object, the number of the detected objects is compared with the number of the detected radio terminal units and when the number of the detected objects is larger than the number of the detected radio terminals, the presence of an illegal object is determined, and wherein said surveillance method further comprises the steps of:

collating positions of the objects with positions of the radio terminal units in the image to search an object for which the collation result indicates non-coincidence; and determining the object for which non-coincident stands to be an illegal object and the position for which non-coincidence stands to be a position of the illegal object.

7. A surveillance method for detecting an illegal object, comprising the steps of:

storing sizes of legitimate objects holding and carrying radio terminal units in a storage unit in advance by making a correspondence between the sizes and pieces of ID data of said radio terminal units;

taking an image of a predetermined area by means of an image-pickup unit;

detecting information inclusive of a number, positions and sizes of objects in the image based on the image taken by said image-pickup unit by means of an object detection unit;

receiving signals transmitted by radio from the radio terminal units held by the objects present in said predetermined area by means of radio reception units;

detecting information inclusive of the number, positions and ID data of the radio terminal units based on the signals received by said radio reception units by means of a terminal detection unit;

detecting, based on the information detected by said object detection unit and the information detected by said terminal detection unit, information concerning an illegal object by means of an illegal object detection unit; and executing by an illegality processing apparatus, a predetermined process when a presence of said illegal object is detected by said illegal object detection unit, wherein the predetermined process includes providing notice of said illegal object by performing at least one of staring recording of said illegal object by a video recording unit and issuing an alarm by an alarm unit.

8. A surveillance method according to claim 7, wherein in the step of detecting information concerning an illegal object, the number of the detected objects is compared with the number of the detected radio terminal units and when the number of the detected objects is equal to or less than the number of the detected radio terminal units, said surveillance methods further comprises the steps of:

taking sizes of legitimate objects holding the radio terminal units out of said storage unit by utilizing the ID data of said detected radio terminal units;

collating sizes of the objects in said image with the sizes, taken out of said storage unit, of the legitimate objects holding the radio terminal units;

comparing the sizes of the objects in said image with the sizes of the objects, taken out of said storage unit, of the objects holding the radio terminal units; and determining an object for which the comparison result indicates non-coincidence to be an illegal object and an position for which the comparison result indicates non-coincidence to be a position of the illegal object.

* * * * *